(12) United States Patent
Yamauchi et al.

(10) Patent No.: US 7,140,787 B2
(45) Date of Patent: Nov. 28, 2006

(54) OPTICAL FIBER MECHANICAL SPLICE WITH STRAIN RELIEF MECHANISM

(75) Inventors: Takaya Yamauchi, Kanagawa (JP); Akihiko Yazaki, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/522,003

(22) PCT Filed: Jul. 15, 2003

(86) PCT No.: PCT/US03/21915

§ 371 (c)(1),
(2), (4) Date: Jan. 14, 2005

(87) PCT Pub. No.: WO2004/019096

PCT Pub. Date: Mar. 4, 2004

(65) Prior Publication Data

US 2006/0072884 A1    Apr. 6, 2006

(30) Foreign Application Priority Data

Aug. 21, 2002 (JP) .............................. 2002-240836

(51) Int. Cl.
*G02B 6/255* (2006.01)
(52) U.S. Cl. .......................................... 385/98; 385/99
(58) Field of Classification Search ............ 385/95–99, 385/134–136
See application file for complete search history.

(56) References Cited

U.S. PATENT DOCUMENTS

| 4,865,412 A | 9/1989 | Patterson | 385/71 |
|---|---|---|---|
| 5,013,123 A | 5/1991 | Patterson | 385/98 |
| 5,042,902 A * | 8/1991 | Huebscher et al. | 385/72 |
| 5,102,212 A | 4/1992 | Patterson | 385/98 |
| 5,159,653 A | 10/1992 | Carpenter et al. | 385/95 |
| 5,189,717 A | 2/1993 | Larson et al. | 385/95 |
| 5,337,390 A | 8/1994 | Henson et al. | 385/81 |
| 5,638,477 A | 6/1997 | Patterson et al. | 385/99 |
| 5,682,450 A | 10/1997 | Patterson et al. | 385/65 |
| 5,708,746 A | 1/1998 | Kim et al. | 385/95 |
| 5,734,770 A | 3/1998 | Carpenter et al. | 385/72 |
| 5,963,699 A * | 10/1999 | Tanaka et al. | 385/97 |
| 6,457,878 B1 * | 10/2002 | Edwards et al. | 385/96 |

FOREIGN PATENT DOCUMENTS

JP        10-170748        6/1998

* cited by examiner

*Primary Examiner*—Sung Pak
*Assistant Examiner*—Daniel Petkovsek
(74) *Attorney, Agent, or Firm*—Gregg H. Rosenblatt

(57) ABSTRACT

An optical fiber splicing member can hold optical fiber buffer coatings stably in a simple structure as compared with conventional art and enables use of an existing splicing tool. There are provided a joint element 110, a jacket 120, buffer retainers 131 and a cap 140. By setting and pressing the cap to the jacket, it becomes possible to splice bare fibers of optical fibers 190 with each other by the joint element and to press the buffer coatings 192 by the buffer retainers. Assembling the splicing member is thus facilitated while the existing optical fiber splicing tool is utilizable as it is. The buffer coatings can be held stably because the holding is achieved through the pressing.

7 Claims, 13 Drawing Sheets

US 7,140,787 B2

OPTICAL FIBER MECHANICAL SPLICE WITH STRAIN RELIEF MECHANISM

CROSS REFERENCE TO RELATED APPLICATIONS

This application is a national stage filing under 35 U.S.C. 371 of PCT/US2003/021915, filed Jul. 15, 2003, which claims priority to JP Application No. 2002/240836, filed Aug. 21, 2002.

TECHNICAL FIELD

The present invention relates to a member for splicing optical fibers by a mechanical pressure fixing system.

BACKGROUND OF THE INVENTION

In one method for splicing ends of optical fibers, there is a mechanical splicing system whereby ends of bare fibers of optical fibers are butted and mechanically fixed to each other with pressure. Ends of the optical fibers to be spliced are butted against each other and fixed with pressure inside a pressing fixing member equipped to a splice as a member for splicing the optical fibers. More specifically, the splice 10 shown in FIG. 15 includes the element 11, a jacket 12 for storing the element 11, end plugs 13-1 and 13-2 each of which has an optical fiber insertion opening 13a and can be fitted in an end of the jacket 12 for guiding the optical fiber, and a cap 14. The element 11 as a V-shaped foldable member holds the bare fibers of the optical fibers inserted from both ends thereof in a state in which both ends of the bare fibers of the optical fibers to be spliced are butt-jointed against each other. When fit to the jacket 12 and pressed down, the cap 14 brings the element 11 in the jacket 12 from an opening state shown in FIG. 16 to a closure state shown in FIG. 17. This operation presses and fixes the bare fibers 20a and 21a inserted in the element 11 as indicated in FIG. 18.

Before each optical fiber is inserted to the splice 10, each of the buffer coatings of the optical fibers is removed with the use of a buffer coating-removing tool by a length not smaller than a length to be fixed by the element 11, whereby the bare fibers 20a, 21a are exposed. A splicing process is from splicing the optical fibers with each other as above to storing the splice to an optical fiber storage tray.

During the splicing process, it is necessary not to twist or apply tension to the optical fibers so as to prevent the optical fibers from damage and connection loss. In other words, if the optical fiber extending from the element 11 is twisted or applied tension, the optical fiber is damaged or subject to loss by micro-bending. Although the bare fibers 20a, 21a of the optical fibers are secured with cramping inside the element 11, portions 22 near the element of the bare fibers 20a, 21a not retained by the element 11 can move freely, and therefore a stress by the twist or tensile force is possibly concentrated to the portions 22 close to the element.

For easing the above stress concentration to the movable portions 22 close to the element, U.S. Pat. No. 5,638,477 discloses an optical fiber splicing member having a function of grasping optical fibers at both sides of the element in an axis direction of the optical fibers. Specifically, as shown in FIGS. 19 and 20, clip members 17 are added to the structure of FIG. 15 for grasping buffer parts of the optical fibers. According to the optical fiber splicing member 30, the buffer part 25 is caught into a narrow gap portion 17a of the clip member 17 by pressing down both the cap 14 and the clip member 17 by a splicing tool at a splicing time. The buffer part 25 is held in this manner, so that the stress is prevented from being generated to the optical fiber at the end of the optical fiber extending from the element 11. A force (of holding the buffer part 25 by the clip member 17) is such that prevents the stress because of extension/contraction of the optical fiber in the axis direction thereof. If the holding force of the clip member 17 is too large, the extension/contraction of the optical fiber in the axis direction by an environmental temperature change cannot be allowed, and the stress is generated to possibly damage the bare fiber.

The structure revealed in U.S. Pat. No. 5,638,477 requires the clip members 17, which more or less complicates assembling the splicing member in a manufacturing process. Moreover, the clip member 17 is required to be pressed down to the inside of the jacket 12 as indicated in FIG. 20. The splicing with the use of the existing splicing tool as it stands is accordingly difficult work, urging some modifications to the splicing tool. While the buffer part 25 is retained in the narrow gap portion 17a of the clip member 17 as above, and since a breadth of the narrow portion 17a is unchangeable, the holding force of the clip member 17 to the optical fiber varies depending on whether the buffer part 25 has a large or small diameter due to manufacturing errors of the buffer part 25. It is feared that the buffer part of the optical fiber cannot be held stably at all times.

SUMMARY OF THE INVENTION

The present invention is devised to solve one or more of the above problems, and has for an object to provide an optical fiber splicing member which has a simple structure, to hold buffer coatings of optical fibers stably as compared with that of conventional art, and to enable using an existing splicing tool.

In order to accomplish the above-described objective, one embodiment of the present invention includes an optical fiber splicing member according to a first aspect for splicing optical fibers each having a bare fiber coated with a buffer coating, which comprises a joint element for retaining the bare fibers in a state in which the bare fibers are butt-jointed against each other.

A jacket is provided which includes an element storage part for storing the joint element, optical fiber passages for guiding the optical fibers to end parts of the joint element stored in the element storage part respectively, and buffer retainers for opposing to the buffer coatings of the optical fibers when the optical fibers are extended along the optical fiber passages.

Pressing parts are provided for pressing the buffer retainers to the buffer coatings of the optical fibers when the optical fibers are extended along the optical fiber passages.

An optical fiber splicing member according to a second aspect of the present invention includes a joint element for retaining bare fibers of two optical fibers each having the bare fiber coated with a buffer coating in a state in which the bare fibers are butt-jointed against each other.

A jacket is also provided which includes an element storage part for storing the joint element, and optical fiber passages for guiding the optical fibers to end parts of the joint element stored in the element storage part respectively.

Buffer retainers constituted integrally with the jacket are provided for opposing to the buffer coatings of the optical fibers when the optical fibers are extended along the optical fiber passages.

Also, a cap is provided which is mounted to the jacket and moves in an orthogonal direction to an extension direction of the optical fibers when the optical fibers are extended in the optical fiber passages. The cap includes a cap body, a holding part formed to the cap body to be engaged with the joint element stored in the element storage part through the movement of the cap in the orthogonal direction for causing the joint element to retain the bare fibers, and pressing parts formed to the cap body for pressing the buffer retainers to the buffer coatings through the movement of the cap in the orthogonal direction.

In the optical fiber splicing member of the second aspect, each of the buffer retainers can be constituted to include a first tongue-shaped member extending in the extension direction, and an engagement part formed to the first tongue-shaped member in a manner to be able to engage with the pressing part for moving the first tongue-shaped member towards the buffer coating through the movement of the cap in the orthogonal direction.

Also in the optical fiber splicing member of the second aspect, each of the pressing parts of the cap can include a first projecting member which is to project from the cap body in the orthogonal direction, where the engagement part can be constituted to include a second projecting member which comes in touch with the first projecting member to move the first tongue-shaped member towards the buffer coating by the movement of the first projecting member in the orthogonal direction.

The optical fiber splicing member of the second aspect can be further constituted so that each of the pressing parts of the cap can include a first projecting member which is to project from the cap body in the orthogonal direction, while each of the buffer retainers can include a second tongue-shaped member extending in the extension direction which comes in contact with the first projecting member to move towards the buffer coating by the movement of the first projecting member in the orthogonal direction.

The jacket in the optical fiber splicing member of the second aspect can be constructed to have end plug storage parts formed to both end parts thereof. Also, end plugs including the buffer retainers and extending in the same direction as the direction of the optical fiber passages can be constituted integrally with the jacket by being fitted in the end plug storage parts.

DETAILED DESCRIPTION OF THE INVENTION

Figure 1:
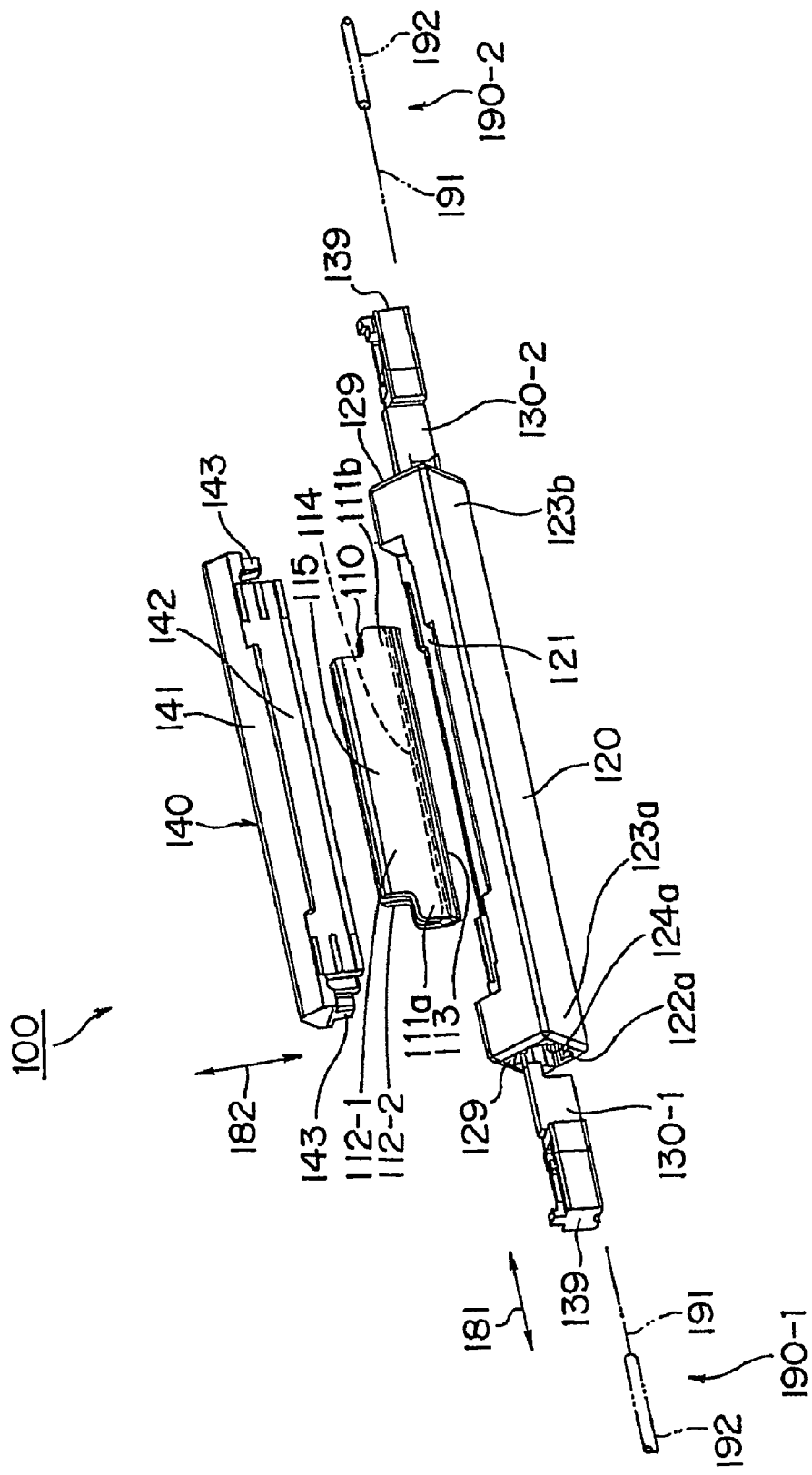
FIG. 1 is an exploded perspective view of an optical fiber splicing member as an embodiment of the present invention.

An optical fiber splicing member and a method for splicing optical fibers which is carried out with the use of the splicing member as an embodiment of the present invention will be described below with reference to the drawings throughout which like parts are designated by like reference numerals.

Figure 2:
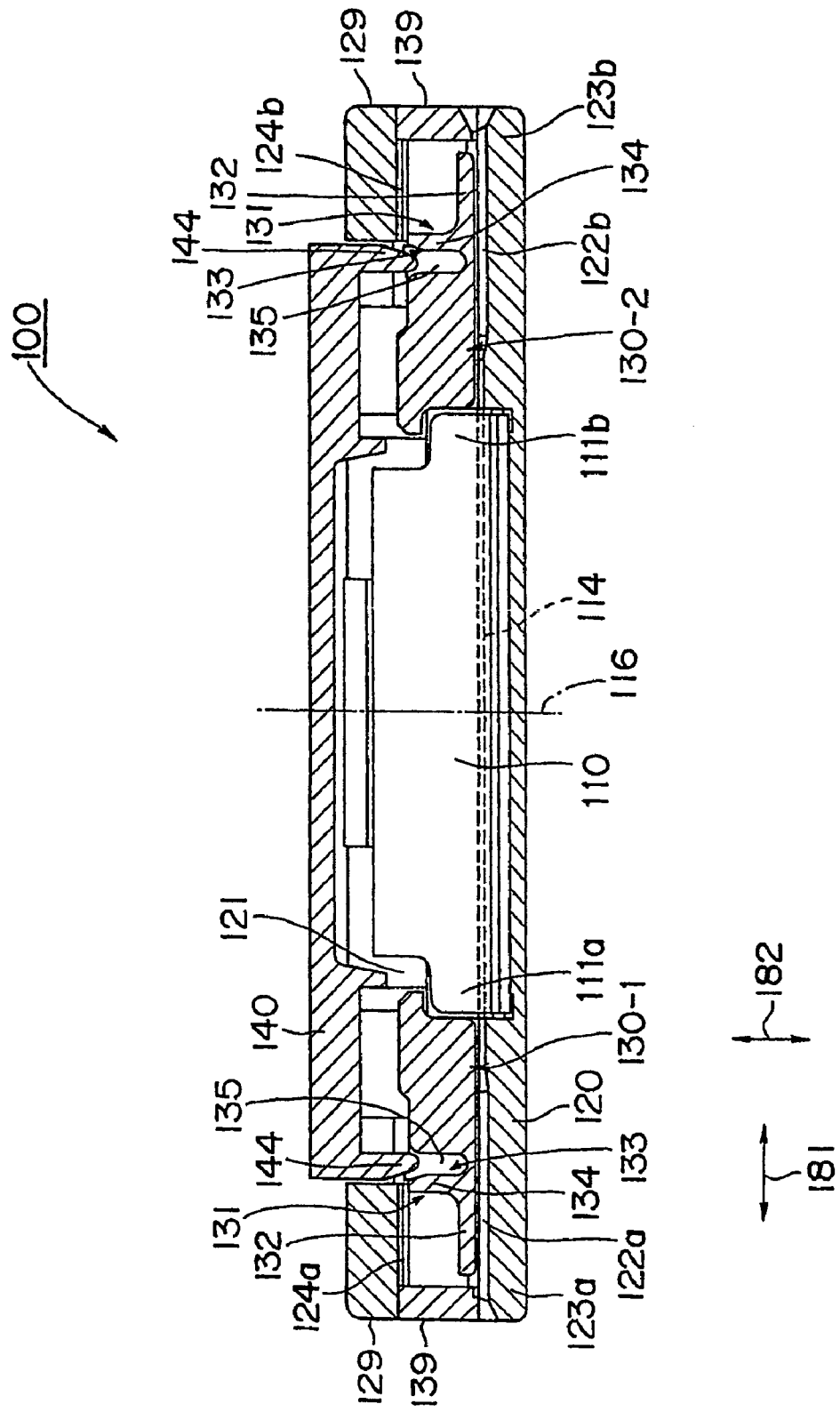
FIG. 2 is a sectional view of the optical fiber splicing member shown in FIG. 1.

As shown in FIGS. 1 and 2, the optical fiber splicing member 100 is provided with a joint element 110, a jacket 120, two end plugs 130 and a cap 140. Optical fibers 190-1 and 190-2 (generally referred to as "an optical fiber 190" in some cases) are inserted from the side of both ends of the optical fiber splicing member 100 as shown in the drawings when splicing the optical fibers 190. The optical fiber 190 in the embodiment is constituted of a bare fiber 191 formed of a glass material, and a buffer coating 192 for coating the bare fiber 191. In splicing the optical fibers by the optical fiber splicing member 100, the buffer coating 192 of each optical fiber 190 is removed beforehand by a specified length with the use of a special buffer-removing tool, thereby exposing the bare fiber 191, and then the bare fiber 191 is cut. A material of the bare fiber 191 is not limited to the above glass material and can be a known resin material used for optical fibers.

Each part constituting the optical fiber splicing member 100 will be described below.

The joint element 110 is a member obtained by folding two plate materials 112-1 and 112-2 at a coupling part 113 into a V shape. The joint element 110 is openable between a non hold position where the element does not hold the bare fibers 191 and a hold position where the element holds the bare fibers 191 as will be described later. A bare fiber storage groove 114 for guiding and supporting each of the bare fibers 191 is formed along a longitudinal direction of the joint element 110 to at least an inner face of one plate material 112-1, 112-2. The joint element 110 holds the bare fibers 191 inserted to the groove 114 from end parts 111a and 111b of the joint element 110 at the above-referred hold position in a state in which the leading ends of the bare fibers 191 are butt-jointed against each other.

The jacket 120 is a rod-shaped member as illustrated, having an element storage part 121 formed to a central part in its longitudinal direction for storing the joint element 110 extending in the same direction as a direction of the jacket 120. The jacket 120 has also optical fiber passages 122a and 122b (generally referred to as "an optical fiber passage 122" in some cases) for guiding the optical fibers 190-1 and 190-2 to the end parts 111a and 11b of the joint element 110 stored in the element storage part 121 respectively. The optical fiber passages 122a and 122b extend from ends 123a and 123b of the jacket 120 along the longitudinal direction of the jacket 120 to the element storage part 121, and communicate with the bare fiber storage groove 114 of the joint element 110 stored in the element storage part 121.

As shown in FIG. 1, the above element storage part 121 is formed so that a depth direction thereof is parallel to a diagonal of the jacket 120 shaped like a squared timber. This constitution enables the jacket 120 to accommodate the joint element 110 having the dimension of a height larger than a length of one side of the jacket 120.

Further, according to the present embodiment, the jacket 120 has end plug storage parts 124a and 124b formed to the ends 123a and 123b thereof respectively. The end plug storage parts 124a and 124b extend along the longitudinal direction of the jacket 120 into the jacket 120. Since the end plug storage part 124a, 124b and the optical fiber passage 122a, 122b extend in the longitudinal direction at the end 123a, 123b of the jacket 120, there is presented a recess-shaped groove which forms the optical fiber passage 122a, 122b to a part of the end plug storage part 124a, 124b respectively as indicated in the drawings.

Figure 3:
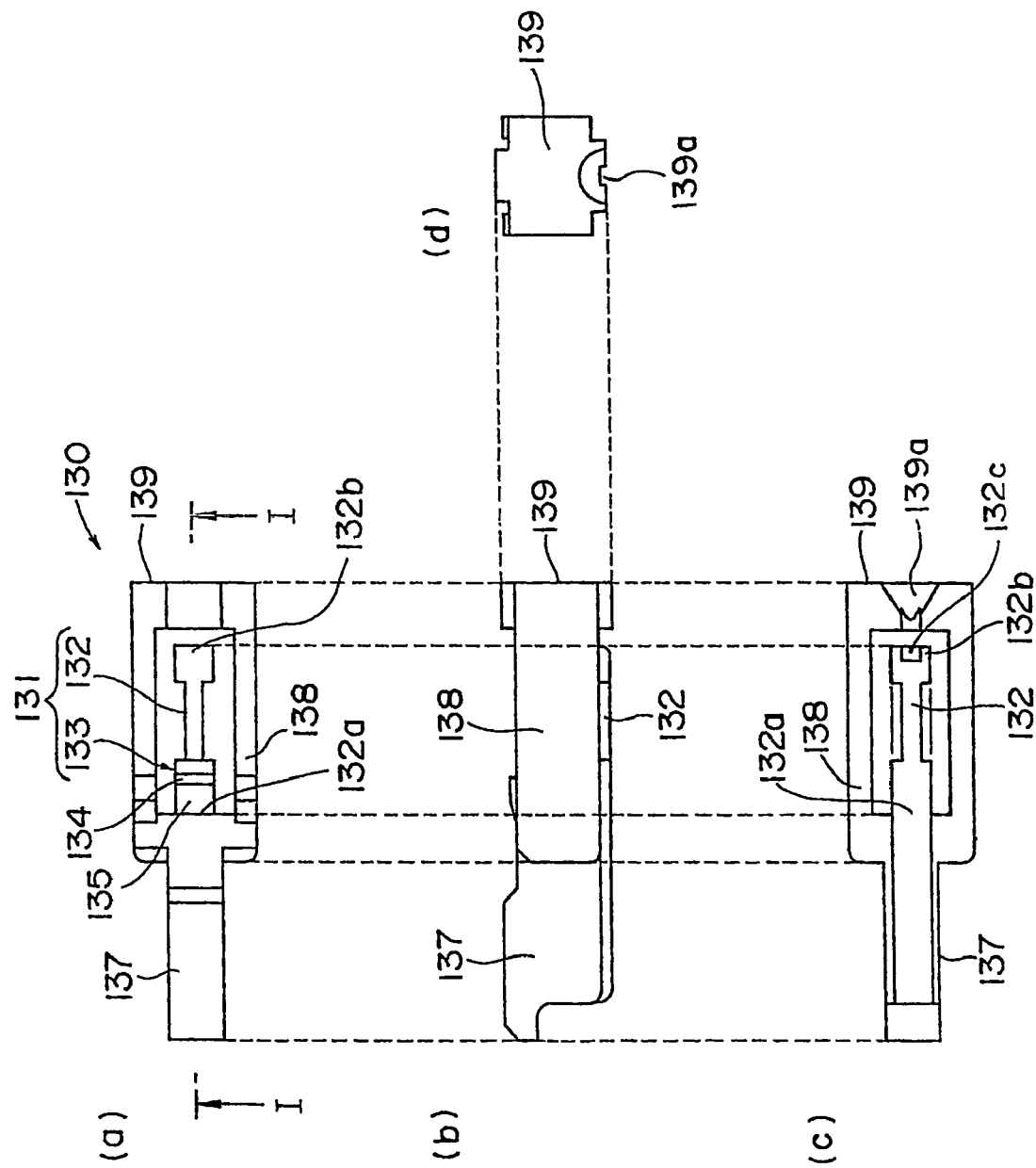
FIG. 3 is a diagram of an end plug of the optical fiber splicing member of FIG. 1, (a) being a plan view, (b) being a front view, (c) being a rear view and (d) being a right side view.
Figure 4:
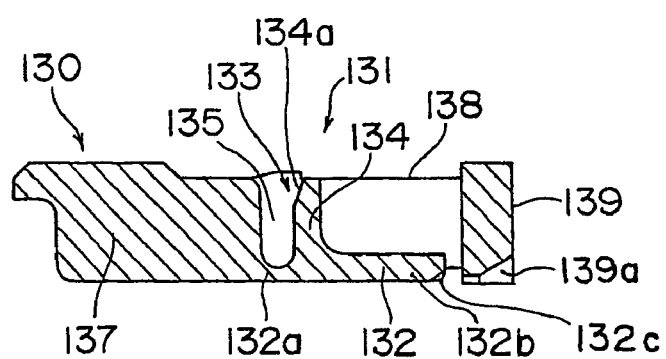
FIG. 4 is a sectional view of the end plug taken at a part I—I shown in FIG. 3(a)

The end plug 130 shaped as shown in FIGS. 3 and 4 is constituted of end plugs 130-1 and 130-2. The (a), (b), (c), and (d) in FIG. 3 correspond to a plan view, a front view, a rear view and a right side view of the end plug 130 respectively, and FIG. 4 corresponds to a sectional view taken along the line I—I of the (a) in FIG. 3. The end plugs 130-1 and 130-2 identical in the shape are installed to the end plug storage parts 124a and 124b from both ends of the jacket 120 so that an end face 139 of the end plug 130 is even with an end face 129 of the jacket 120, then fitted and accommodated in the end plug storage parts 124a and 124b respectively to be integral with the jacket 120. When the end plug 130 is stored in the end plug storage part 124, the recess-shaped groove formed to the end plug storage part 124 forms the optical fiber passage 122a, 122b because a blockage of the groove is not caused by the end plug 130. The optical fibers 190-1 and 190-2 are inserted and extended in the optical fiber passages 122a and 122b respectively.

The end plug 130 is formed by integrally molding a leading part 137 and a hollow frame-shaped body part 138 as shown in FIG. 3. The body part 138 has a buffer retainer 131 extending along the axis direction of the end plug 130 to be opposite to the optical fiber passage 122. The buffer retainer 131 has a first tongue-shaped member 132 and an engagement part 133 formed to the first tongue-shaped member 132.

The first tongue-shaped member 132 is a nearly strip-shaped plate member having one end 132a supported to the body part 138 while having the other end 132b being made a free end, extending in a direction 181 in which the optical fiber 190 set to the optical fiber passage 122 extends. The first tongue-shaped member 132 can accordingly oscillate centering the one end 132a as a fulcrum by an elastic force possessed by a material of the first tongue-shaped member 132. As shown in FIG. 4, the other end 132b of the first tongue-shaped member 132 has a recessed and inclined optical fiber introduction part 132c formed to a position opposite to an optical fiber insertion opening 139a of the end plug 130 so that the optical fiber 190 inserted from the optical fiber insertion opening 139a can move into the jacket 120 smoothly.

According to the embodiment, the engagement part 133 has a second projecting member 134 projecting from the first tongue-shaped member 132 in the vicinity of the one end 132a, and a recess 135 defined by the body part 138 and the second projecting part 134.

In the end plug 130 constituted as described above, when a first projecting member 144 which constitutes a pressing part 143 equipped to the cap 140 to be depicted below comes into contact with the second projecting member 134 and then engages with the second projecting member 134, the first tongue-shaped member 132 deflects at the one end 132a as the fulcrum towards the optical fiber 190 set to the optical fiber passage 122. As a result of the deflection, the buffer coating 192 of the optical fiber 190 is pressed to the optical fiber passage 122. The first tongue-shaped member 132 returns to an original non press position by its own elastic force when the contact of the first projecting member 144 and the second projecting member 134 is released. A force against the pressing the optical fiber passage 122 by the first tongue-shaped member 132 changes, e.g., by a degree of the engagement between the first projecting member 144 and the second projecting member 134, and therefore is changeable by designing an arrangement position of the first projecting member 144 and the second projecting member 134 or by the material of the first projecting part 132 as mentioned earlier.

In order to make the first tongue-shaped member 132 effectively deflect, and facilitate the engaging the first projecting member 132 and the second projecting member 134, the second projecting member 134 has an inclination part 134a according to the present embodiment as indicated in FIG. 4.

There is provided the second projecting member 134 as above in a form of the engagement part 133 for making the first tongue-shaped member 132 move towards the optical fiber 190 according to the embodiment. However, the engagement part 133 is not limited to the above form, and can adopt any form conceivable by those skilled in the art on the basis of a form of the pressing part 143 equipped to the cap 140.

Also according to the present embodiment, the end plug 130 is employed and the buffer retainer 131 is provided to the end plug 130 from a viewpoint of facilitating the manufacture. However, the present invention is not restricted to the embodiment. That is, the buffer retainer 131 may be integrally formed directly to the jacket 120 so long as various conditions on the manufacture, costs, etc. are satisfied.

Figure 5:
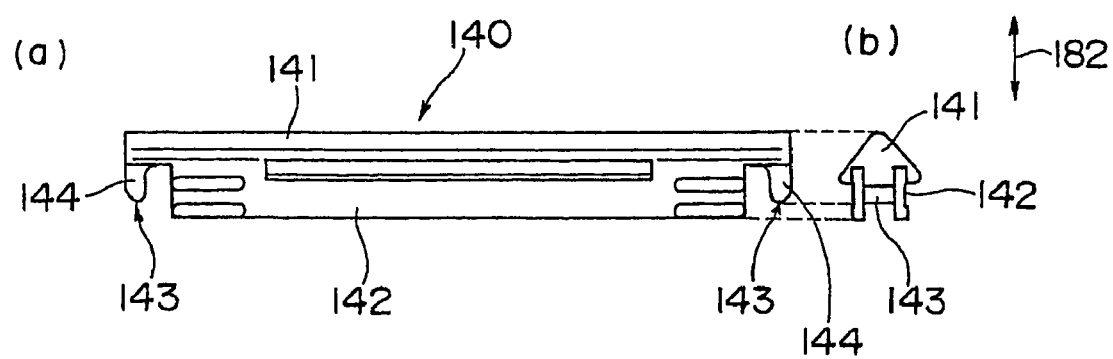
FIG. 5 is a diagram of a cap of the optical fiber splicing member of FIG. 1, (a) being a front view and (b) being a right side view.

Now, the cap 140 will be described. The cap 140 shaped as shown in FIG. 5 includes a cap body 141, a holding part 142, and pressing parts 143. The (a) and (b) in FIG. 5 correspond to a front view and a right side view of the cap 140 respectively. As is apparent from FIGS. 1 and 2, the cap 140 is detachable to the jacket 120 to cover the element storage part 121. After attaching the cap 140 to the jacket 120, the worker can move the fitted cap 140 in an orthogonal direction 182 orthogonal to the extension direction 181. The holding part 142 is formed to the cap body 141, and fits in the joint element 110 stored in the element storage part 121 when the cap 140 is moved toward the orthogonal direction 182, thereby making the joint element 110 hold the bare fibers 191.

Figure 6:
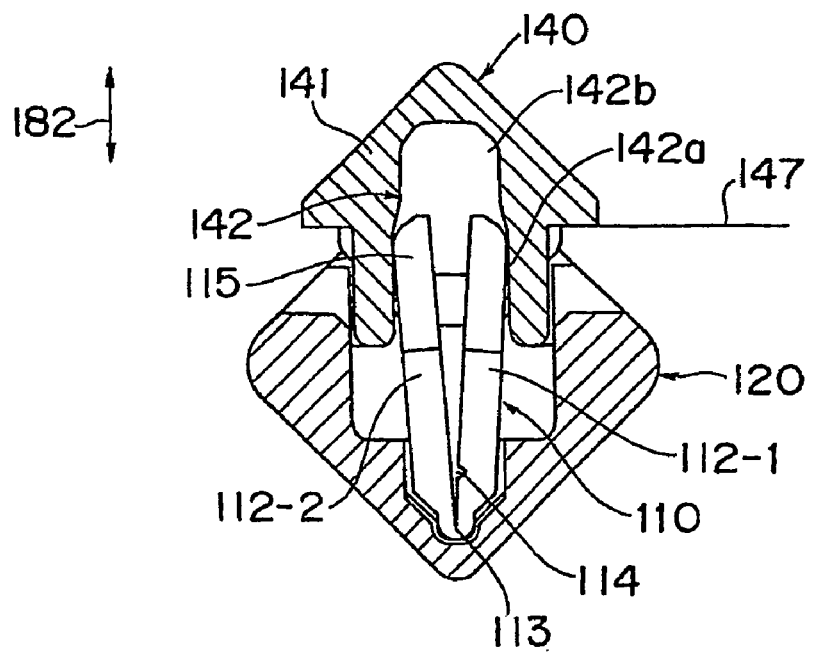
FIG. 6 is a diagram for explaining an operation of holding a bare fiber by a joint element provided to the optical fiber splicing member of FIG. 1, showing a state in which the joint element is open.
Figure 7:
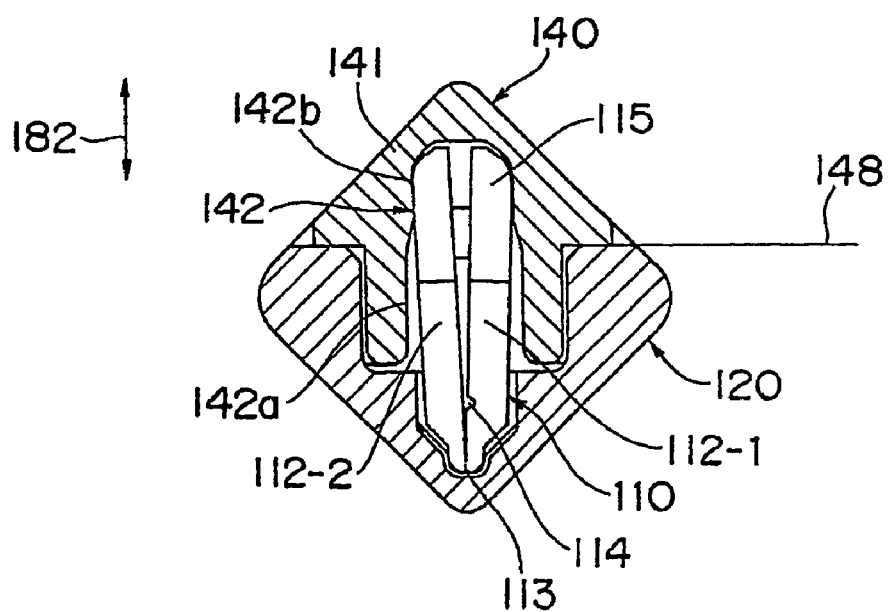
FIG. 7 is a diagram for explaining the operation of holding the bare fiber by the joint element provided to the optical fiber splicing member of FIG. 1, showing a state in which the joint element is closed.

More specifically, as shown in FIGS. 6 and 7, the recess-like holding part 142 is formed inside the cap body 141, which accommodates the joint element 110 and makes the joint element 110 execute the above holding. The holding part 142 has a wide part 142a and a narrow part 142b. As indicated in the drawings, the wide part 142a and the narrow part 142b are sequentially formed in this order from an open side of the holding part 142 along the orthogonal direction 182. At a time point when the cap 140 is fitted to the jacket 120 as in FIG. 6, the cap 140 is positioned to a set position 147. An upper part 115 of the joint element 110 is positioned to the wide part 142a of the holding part 142 at this time. Therefore, the two plate materials 112-1 and 112-2 of the joint element 110 are kept in an open state, and the joint element 110 is in a non hold state to the bare fibers 191.

On the other hand, when the cap 140 is pressed down along the orthogonal direction 182 from the set position 147 to a setting completion position 148, the upper part 115 of the joint element 110 is positioned to the narrow part 142b of the holding part 142 as shown in FIG. 7. The plate materials 112-1 and 112-2 of the joint element 110 are consequently brought to a close state, whereby the joint element 110 becomes in a state to hold the bare fibers 191.

When the cap 140 is returned from the setting completion position 148 to the setting position 147, the joint element 110 returns to the open state by an elastic force of the joint element 110, releasing the holding the bare fibers 191.

As will be described below, the above operation of pressing down the cap 140 also makes the first tongue-shaped members 132 of the buffer retainers 131 press the buffer coatings 192 of the optical fibers 190. The pressing operation for the buffer coatings is carried out after the holding operation for the bare fibers. The timing will be detailed later.

The pressing part 143 corresponds to the first projecting member 144 projecting from the cap body 141 along the orthogonal direction 182 at each end of the cap body 141 according to the present embodiment. As is depicted in the description of the end plug 130, the pressing part 143 presses the first tongue-shaped member 132 of the buffer retainer 131 to the buffer coating 192 of the optical fiber 190 when the cap 140 is moved in the orthogonal direction 182. The pressing part 143 is not limited to a form with a projecting member like the first projecting member 144. Any form conceivable by those skilled in the art in conformity with the form of the engagement part 133 for moving the first tongue-shaped member 132 towards the optical fiber 190 can be adopted.

A pressing force of the first tongue-shaped member 132 to the buffer coating 192 is at least such that a torsion or twist normally generated to the optical fiber 190 during a splicing process is not directly transmitted to the bare fiber part in the vicinity of the joint element 110. In other words, if the force of holding the buffer coating 192 is excessive, the extension/contraction in the axis direction of the optical fiber 190 by an environmental temperature change cannot be allowed, thereby generating a stress to the optical fiber 190 unfavorably and possibly damaging the bare fiber 191. Furthermore, even the bare fiber 191 held inside the joint element 110 may be affected unfavorably and possibly cutting with the splicing. The pressing force to the buffer coating 192 is accordingly preferably of a level such that the extension/contraction in the axis direction of the optical fiber 190 is allowed even when the pressing force becomes to the maximum. By way of example in the embodiment, the force of holding the bare fiber 191 by the joint element 110 is approximately 9.8N, while the pressing force to the buffer coating 192 is approximately 0.1–5N.

Figure 8:
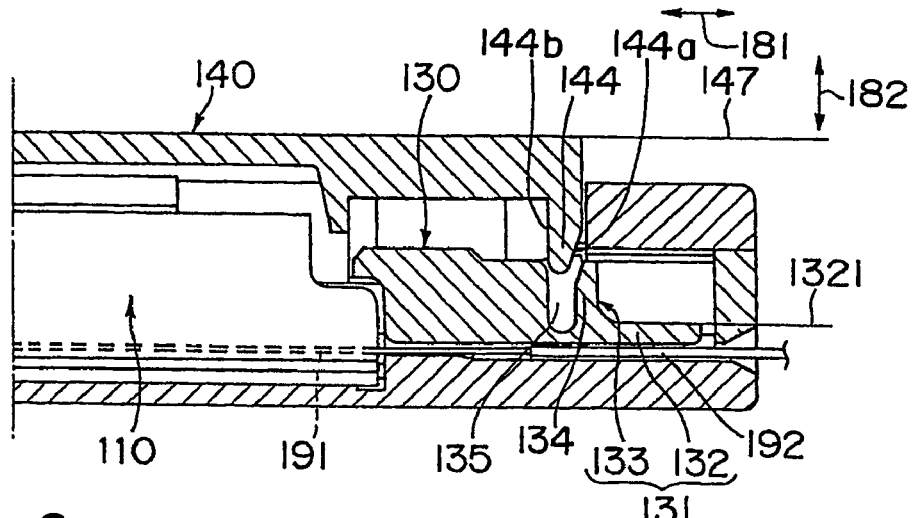
FIG. 8 is a diagram for explaining an operation of pressing a buffer coating of an optical fiber by a buffer retainer provided to the optical fiber splicing member of FIG. 1, showing a state in which the pressing operation is not carried out.
Figure 9:
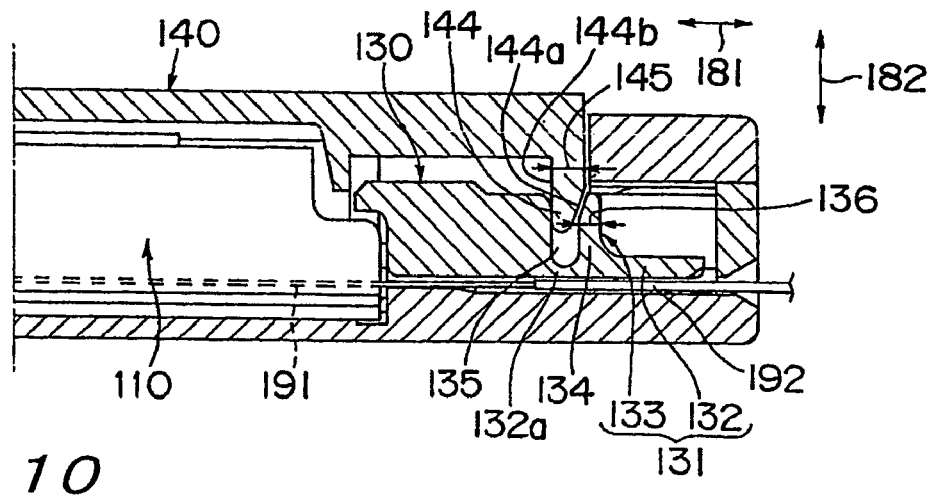
FIG. 9 is a diagram for explaining the operation of pressing the buffer coating of the optical fiber by the buffer retainer provided to the optical fiber splicing member of FIG. 1, showing an initial state of the pressing operation.
Figure 10:
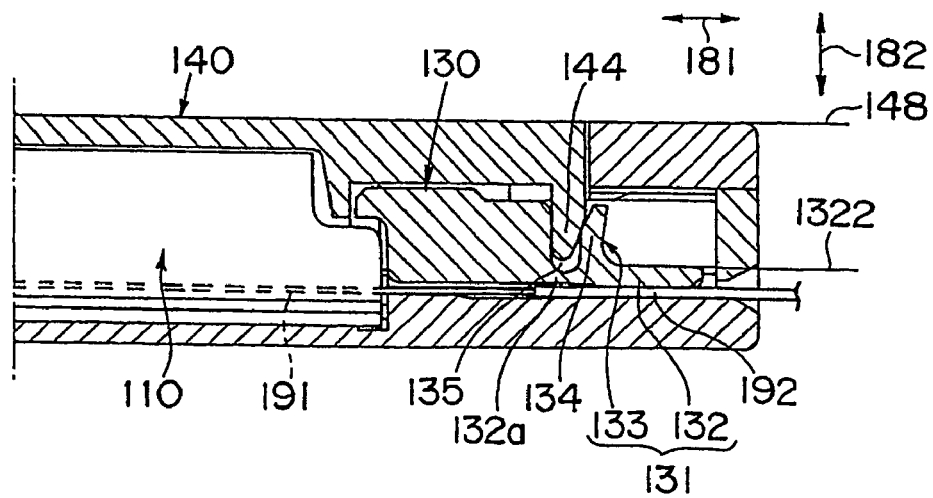
FIG. 10 is a diagram for explaining the operation of pressing the buffer coating of the optical fiber by the buffer retainer provided to the optical fiber splicing member of FIG. 1, showing a state in which the pressing operation is completed.

Referring to FIGS. 8–10, the pressing operation for the buffer coating 192 by the first tongue-shaped member 132 of the buffer retainer 131 in accordance with the movement of the cap 140 in the orthogonal direction 182 will be described in detail, assuming that, as described earlier, the joint element 110 and the end plug 130 are set to the jacket 120, and moreover, each optical fiber 190 is inserted from the end of the jacket 120 with the leading end of each bare fiber 191 butted-jointed inside the joint element 110.

As shown in FIG. 8, when the cap 140 is positioned at the setting position 147, the first projecting member 144 constituting the pressing part 143 of the cap 140 is positioned to a position where the first projecting member is engageable with the recess 135 of the engagement part 133 of the end plug 130. The first projecting member 144 does not yet come into contact with the second projecting member 134 of the engagement part 133 at this time. The first tongue-shaped member 132 of the buffer retainer 131 is positioned to the non press position 1321 where the first tongue-shaped member does not press the buffer coating 192.

In the middle of the movement of the cap 140 from the setting position 147 to the setting completion position 148, as shown in FIG. 9, the first projecting member 144 while advancing to the recess 135 comes to butt against the second projecting member 134. A width dimension 145 of the first projecting member 144 in the extension direction 181 is larger than a width dimension 136 of the second projecting member 134 in the same direction. The first projecting member 144 has an inclined part 144a which defines a contact face of the first projecting member to the second projecting member 134 like a wedge. Accordingly, as the cap 140 moves to the setting completion position 148, the first projecting member 144 moves the second projecting member 134 by the action of the inclined part 144a to a direction in which the recess 135 is expanded. This movement of the second projecting member 134 causes the first tongue-shaped member 132 formed integrally with the second projecting member 134 at the one end 132a as the fulcrum to deflect towards the optical fiber 190 set to the optical fiber passage 122.

As shown in FIG. 10, when the cap 140 is placed to the setting completion position 148, the first tongue-shaped member 132 is further deflected centering the one end 132a, with pressing the buffer coating 192 of the optical fiber 190 to the optical fiber passage 122. At this time, the first tongue-shaped member 132 is disposed to the press position 1322.

Since the first projecting member 144 advances to the recess 135 while expanding the recess 135, the buffer retainer 131 having the first tongue-shaped member 132 applies a force to the first projecting member 144. But the first projecting member 144 is prevented from being deflected because a non contact face 144b of the first projecting member 144 opposite to the contact face where the inclined part 144a is formed is a plane parallel to the orthogonal direction 182, and the non contact face 144b contacts the body part 138 having a relatively large rigidity as compared with the second projecting member 134 at the recess 135 as is shown in (a) of FIG. 3. The first projecting member 144 can surely deflect the first tongue-shaped member 132 via the first projecting member 144.

As above, the pressing force is generated by the elastic force of the second projecting member 134 and the first tongue-shaped member 132 caused by the deformation of the second projecting member 134 through interference with the first projecting member 144. Therefore, by appropriately selecting a modulus of elasticity of a material constituting the buffer retainer 131, i.e., a modulus of elasticity of a material of the end plug 130 in the embodiment, the buffer coating 192 can be held without failure regardless of whether an outer diameter thereof is made large or small due to production errors.

The buffer coating 192 is preferably pressed over the face rather than at a pinpoint. According to the embodiment, the first tongue-shaped member 132 is a member shaped like a plate and face contacts to the buffer coating 192 as illustrated so as to prevent a partial force from being applied to the optical fiber 190 thereby possibly generating a loss by micro bending in the case of a point contact.

Preferably, the pressing force of the buffer retainer 131 is prevented from acting to the bare fiber 191 at a boundary part where the bare fiber 191 starts to be exposed from the buffer coating 192, because the bare fiber 191 at the boundary part is easiest to break by the reasons that the boundary part is easier to receive the concentration of stress, and has a probability of a minute flaw by an edge of the optical fiber-removing tool, etc.

Further, a diameter of the optical fiber 190 including the optical fiber buffer coating 192 is approximately 250–900 μm while a diameter of only the bare fiber 192 is approximately 125 μm, and therefore it is preferred to press the buffer coating 192 rather than the bare fiber 192 when a strength of the optical fiber 190 itself is taken into consideration.

The reason why the operation of pressing the buffer coating by the buffer retainer 131 is carried out after the holding operation for the bare fibers by the joint element 110 as above will be depicted in detail below.

The reason for the above timing is that an extra force would act to the butting part at the leading end of each bare fiber 191 in the joint element 110, or inversely, the butting would be disconnected if the buffer coating 192 were pressed before the bare fiber 191 is held by the joint element 110.

For securing the above timing, in the embodiment, positions in the orthogonal direction 182 of the wide part 142a and the narrow part 142b at the holding part 142 of the cap 140, a length of the first projecting member 144 of the cap 140, a length of the second projecting member 134 of the end plug 130, and an inclination angle and a length of the inclined part 144a of the second projecting member 134 are designed appropriately. In other words, the embodiment is designed so that when the cap 140 starts moving from the setting position 147 towards the setting completion position 148, first, the upper part 115 of the joint element 110 is positioned to the narrow part 142b, and thereafter, the first projecting member 144 starts acting to the second projecting member 134 thereby deflecthe first tongue-shaped member 132.

By employing the above constitution, splicing the bare fibers 191 of the optical fibers 190 and pressing the buffer coatings 192 of the optical fibers 190 can be both achieved by depressing only the cap 140. Further, since it is not necessary to press the cap 140 until it sinks into the jacket 120, a special arrangement to an optical fiber splicing tool, or the like is eliminated, and the conventional splicing tool can be used as it is.

An engineering plastic is preferably cited as the material for the above jacket 120, end plug 130 and cap 140. The joint element 110 is preferably formed of a deformable material of a ductile metal such as an aluminum alloy or the like. The other materials are copper, tin, zinc, lead, indium, gold, their alloys, etc.

A method for splicing the optical fibers 190 with the use of the optical fiber splicing member 100 constituted as above will be described below.

In the first place, the joint element 110 is stored into the element storage part 121 of the jacket 120, and end plugs 130-1 and 130-2 are stored in end plug storage parts 124a and 124b at both ends of the jacket 120 respectively. The cap 140 is arranged to the setting position 147 in a state with the joint element 110 being stored.

Meanwhile, the buffer coating 192 at a splicing end portion of each optical fiber 190-1, 190-2 to be spliced is removed by a predetermined length with the use of the optical fiber buffer removing tool, e.g., a fiber stripper by Sumitomo Electric Industries, Ltd. After each bare fiber 191 is exposed, the bare fiber 191 is cut to a predetermined length.

Figure 11:
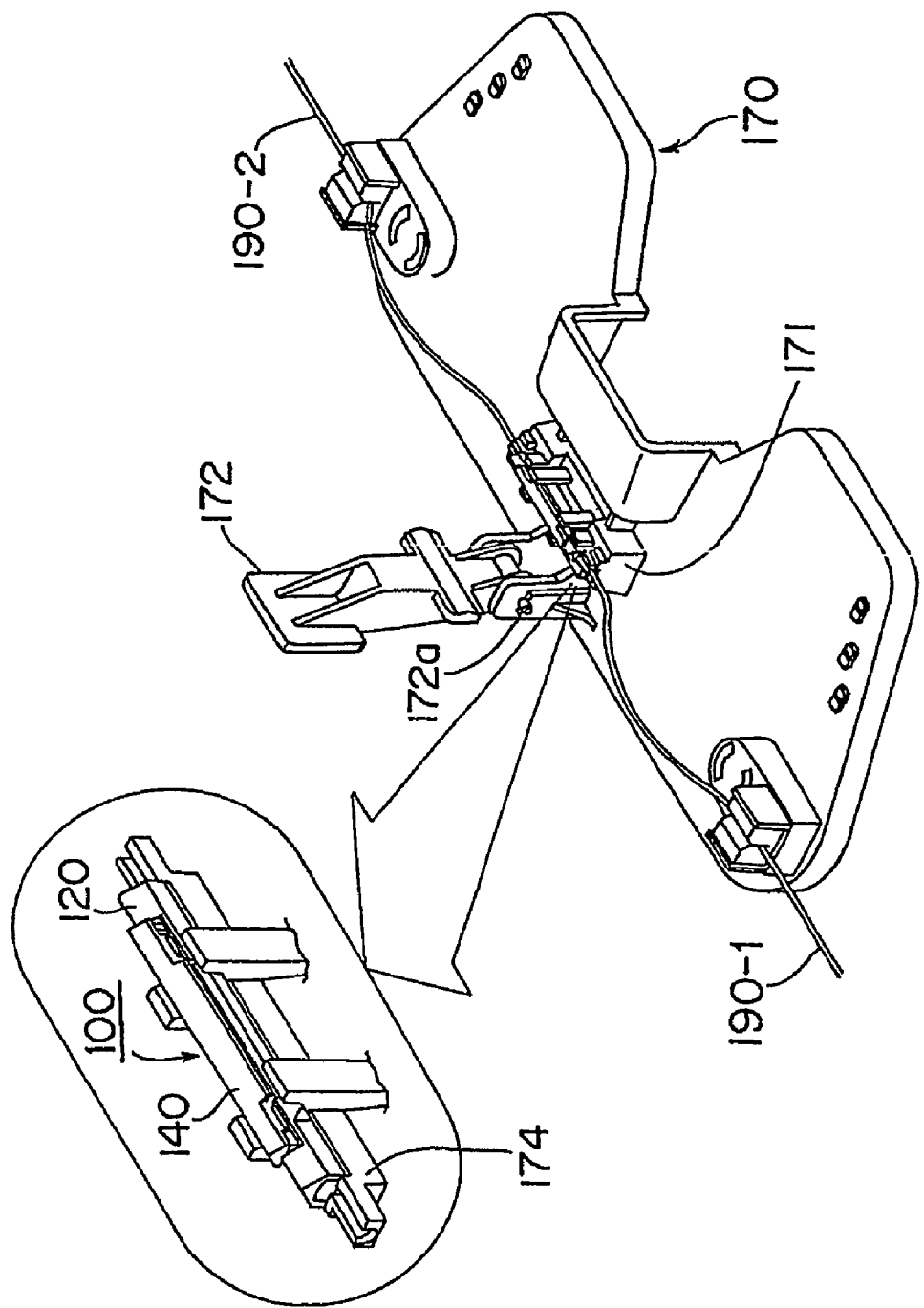
FIG. 11 is a perspective view of a tool to which the optical fiber splicing member of FIG. 1 is mounted for splicing optical fibers.

Then, the optical fiber splicing member 100 having the joint element 110 and the like set to the jacket 120 as above is mounted to an optical fiber splicing member-mounting part 171 of an optical fiber splicing tool 170 shown in FIG. 11 by a worker. In the embodiment, a detachable attachment 174 is attached before mounting the optical fiber splicing member 100 to the optical fiber splicing member-mounting part 171 as shown in FIG. 11. The optical fiber splicing member 100 is mounted to the optical fiber splicing member-mounting part 171 with the diagonal of the prism-shaped jacket 120 being made parallel to the orthogonal direction 182.

Subsequently, in a state with each of the optical fibers 190-1 and 190-2 being curved as in FIG. 11, the bare fibers 191 are inserted to optical fiber insertion openings of the end plugs 130-1 and 130-2 of the optical fiber splicing member 100 respectively by the worker. Each optical fiber 190 including the inserted bare fiber 191 is guided by the optical fiber passage 122a, 122b, so that each bare fiber 191 is introduced into the bare fiber storage groove 114 in the joint element 110. Leading ends of the bare fibers 191 are butted against each other at a central part in the longitudinal direction of the optical fiber splicing member 100, that is, at a central part 116 of the joint element 110 or near the central part. Since the optical fibers 190-1 and 190-2 are curved as mentioned above, leading ends of the bare fibers 191 press against each other and can be maintained in a butting state until the splicing work completes.

A cap pressing member 172 of the optical fiber splicing tool 170 is rotated centering a rotary shaft 172a by the worker, whereby the cap 140 positioned to the setting position 147 is pressed down to the setting completion position 148 along the orthogonal direction 182 and fitted in the jacket 120. The joint element 110 is first closed by the pressing operation, and then the bare fibers 191 are retained while butt-jointed against each other. The first tongue-shaped members 132 are deflected by the first projecting members 144 and the second projecting members 134 after the holding, and the buffer coating 192 of each optical fiber 190 is pressed to the optical fiber passage 122. The splicing work for both optical fibers 190-1 and 190-2 completes hereby.

Figure 12:
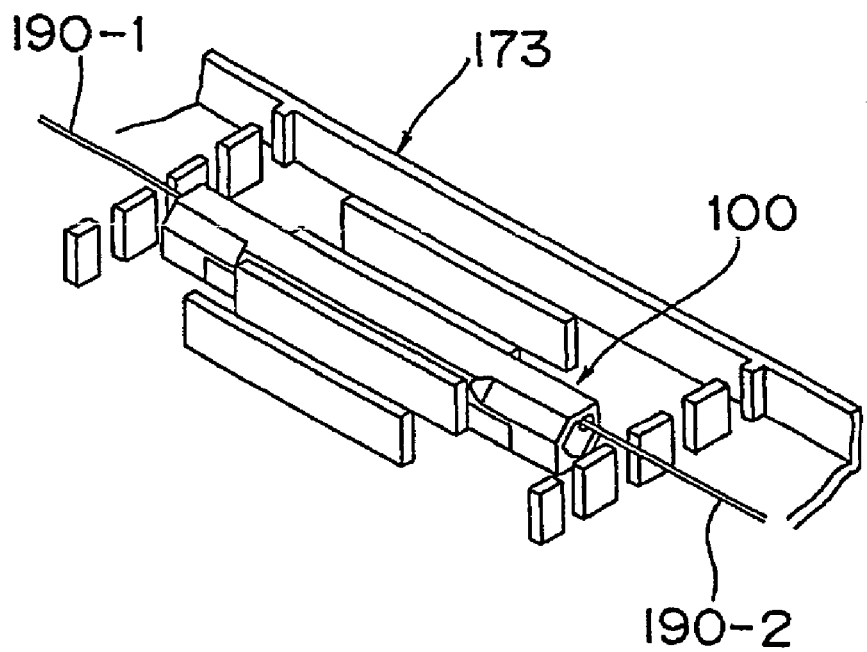
FIG. 12 is a perspective view of a state in which the optical fiber splicing member of FIG. 1 after splicing optical fibers is stored to a tray.

The optical fiber splicing member 100 after splicing the optical fibers 190-1 and 190-2 is stored in an optical fiber storage tray 173 as indicated in FIG. 12.

As described hereinabove, according to the optical fiber splicing member 100 and the method of splicing optical fibers with the use of the optical fiber splicing member 100 of the embodiment, by setting and depressing one cap 140 to the jacket 120, bare fibers 191 can be held by the joint element 110 in a state in which the bare fibers are butt-jointed against each other, and moreover, the buffer coatings 192 can be pressed to the optical fiber passages 122 by the first tongue-shaped members 132. Therefore, it is enough to set only the cap 140 to the jacket 120, facilitating assembling the optical fiber splicing member in the production process.

Since holding the bare fibers 191 and pressing the buffer coatings 192 are both achieved by the operation of depressing the one cap 140 as above, the conventional clip member 17 is eliminated, and the cap 140 is not necessary to be pressed down into the jacket 120. The existing optical fiber splicing tool can be used directly as it is.

Furthermore, since the buffer coating 192 of the optical fiber 190 is held by the pressing by the first tongue-shaped member 132 subsequent to the operation of depressing the cap 140, the holding force for the buffer coating 192 is prevented from changing large in accordance with a change of the diameter of the buffer coating 192 by production errors. The buffer coating 192 of the optical fiber 190 can be held stably accordingly. In addition, the pressing force can be adjusted by appropriately selecting a material of the part constituting the buffer retainer 131.

A modified example of the buffer retainer 131 will be depicted below.

Figure 13:
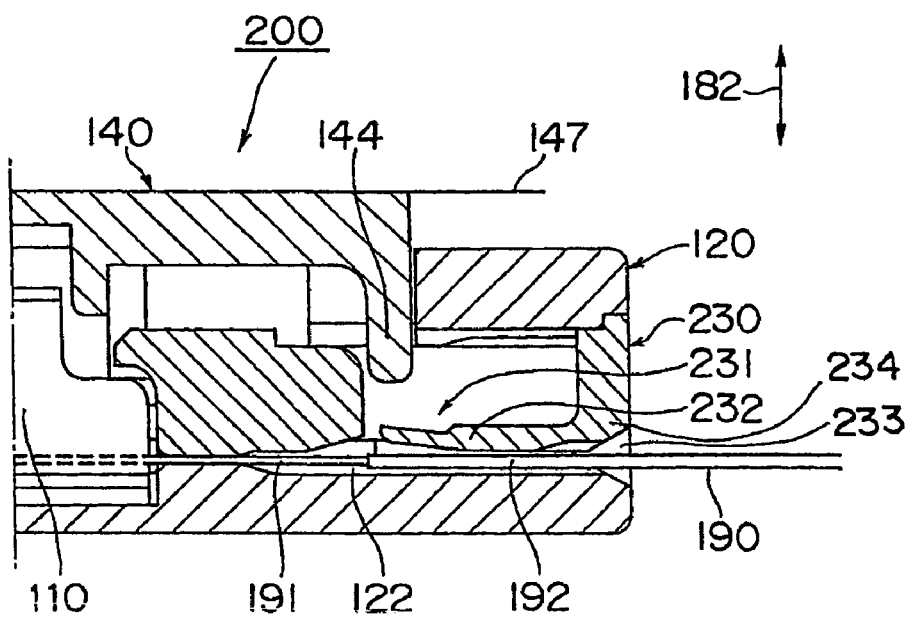
FIG. 13 is a diagram of a modified example of the optical fiber splicing member of FIG. 1, showing a state in which the pressing operation by the buffer retainer is not carried out.
Figure 14:
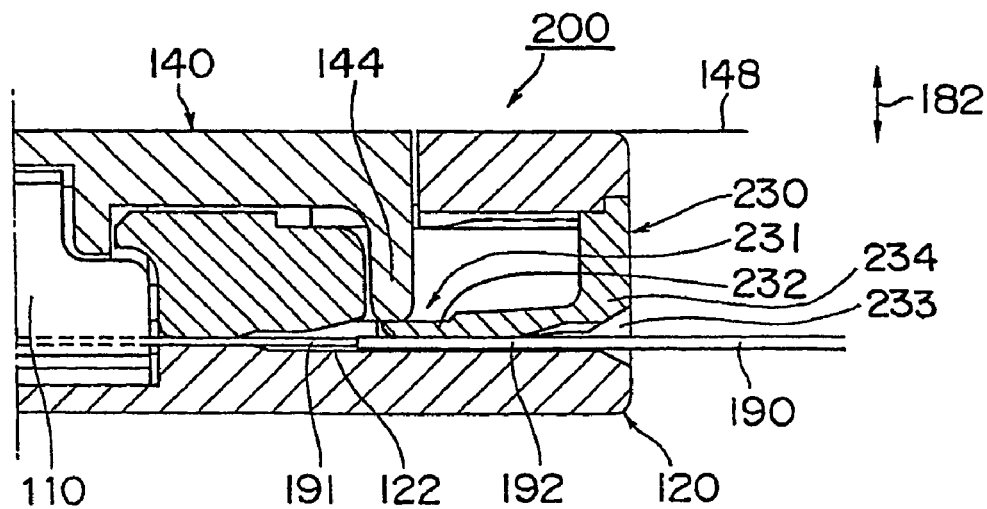
FIG. 14 is a diagram showing a state in which the buffer retainer of FIG. 13 completes the pressing operation.
Figure 15:
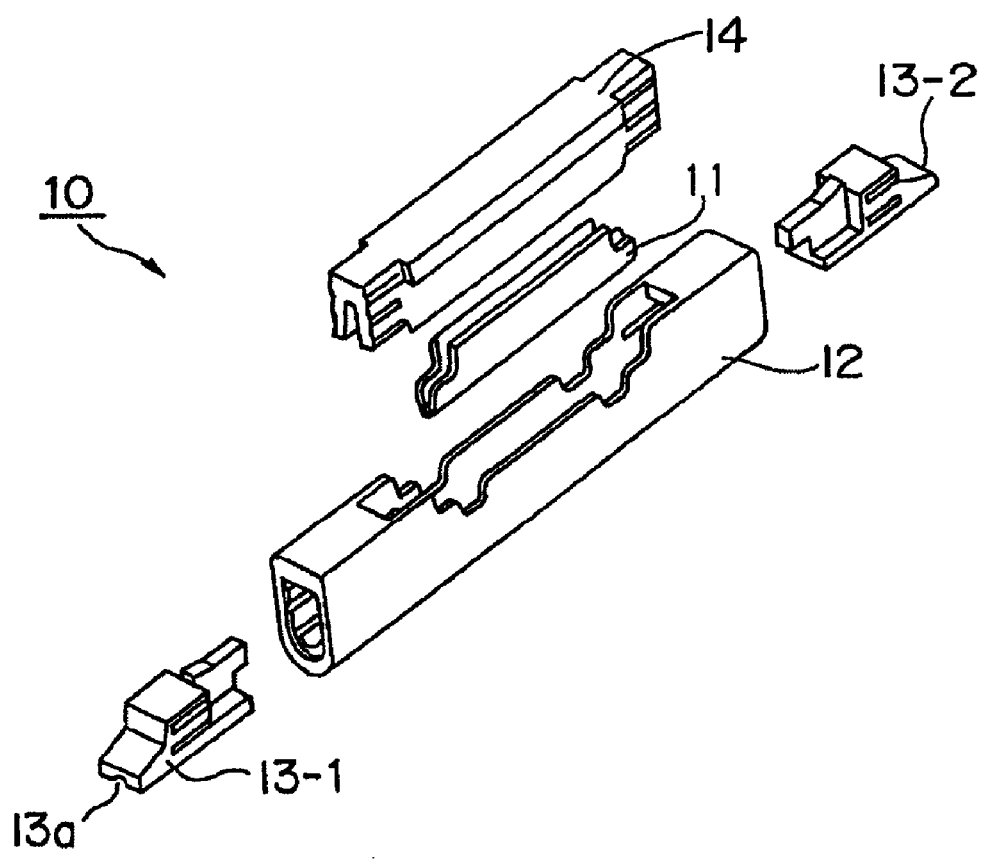
FIG. 15 is an exploded perspective view of a conventional optical fiber splicing member.
Figure 16:
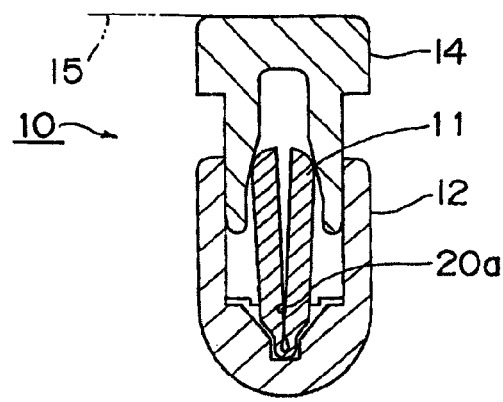
FIG. 16 is a diagram for explaining a splicing operation for the optical fiber by the conventional optical fiber splicing member of FIG. 15.
Figure 17:
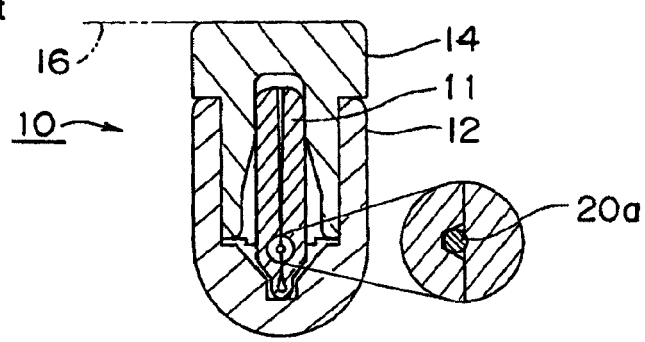
FIG. 17 is a diagram for explaining the splicing operation for the optical fiber by the conventional optical fiber splicing member of FIG. 15.
Figure 18:
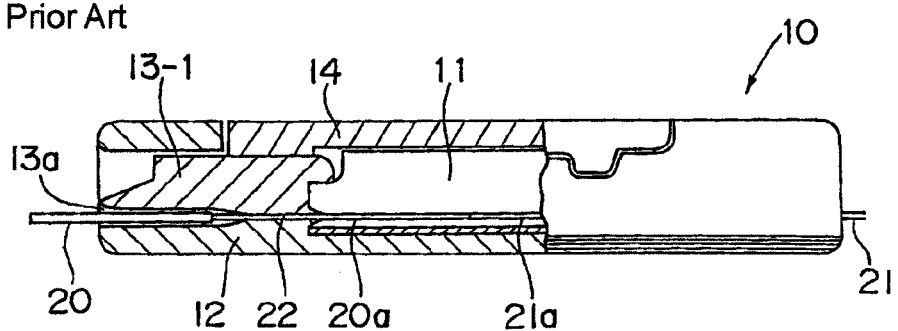
FIG. 18 is a diagram showing a state in which the optical fiber is spliced by the conventional optical fiber splicing member of FIG. 15.
Figure 19:
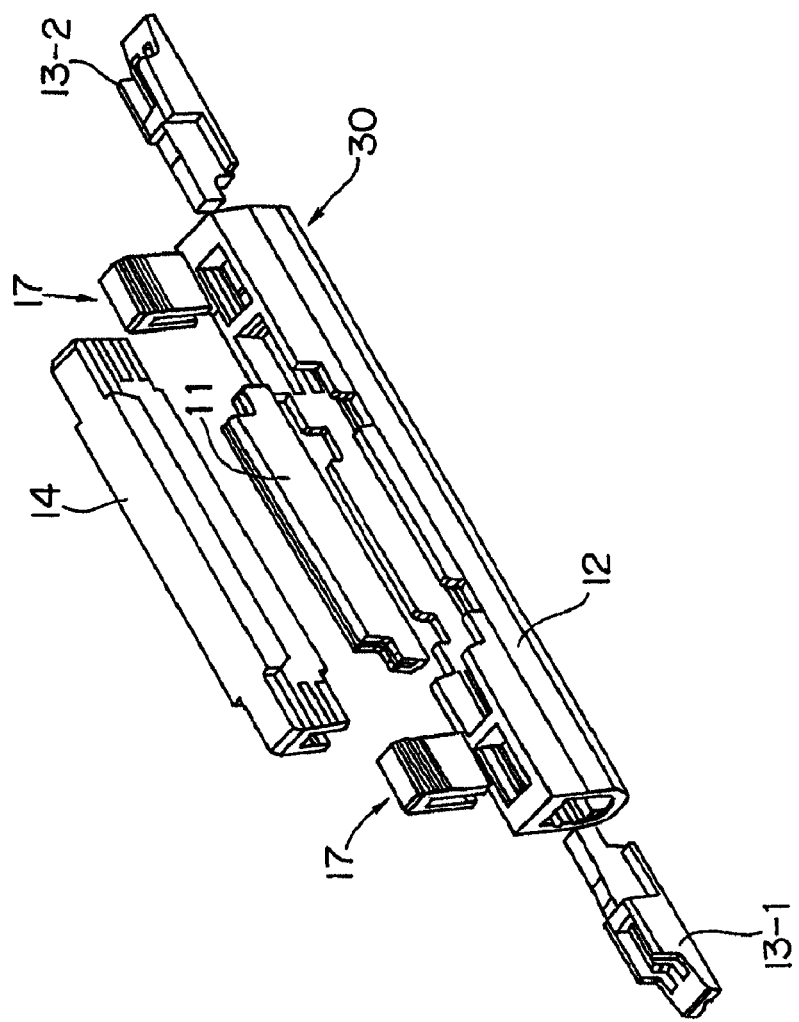
FIG. 19 is an exploded perspective view of another conventional optical fiber splicing member.
Figure 20:
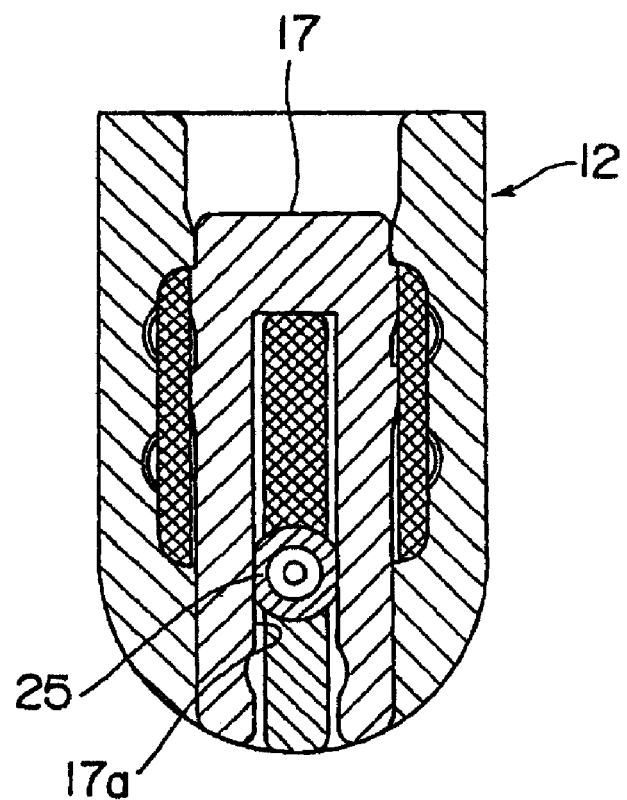
FIG. 20 is a diagram showing a state in which a bare fiber is held by the conventional optical fiber splicing member of FIG. 19.

In the foregoing embodiment, the buffer retainer 131 has the first tongue-shaped member 132 and the engagement part 133 formed to the first tongue-shaped member 132. On the other hand, a buffer retainer 231 can be constituted of only a second tongue-shaped member 232 as shown in FIGS. 13 and 14. The second tongue-shaped member 232 is a strip-shaped plate-like member extending in the extension direction 181, which comes into contact with the first projecting member 144 and moves toward the buffer coating 192 through the movement of the projecting member 144 in the orthogonal direction 182. The second tongue-shaped member 232 can be formed, e.g., to an end plug 230. When the second tongue-shaped member 232 is to be formed to the end plug 230, it is preferable to form the second tongue-shaped member 232 to extend from an end plug edge 234 formed to an insertion opening 233 for the optical fiber 190 to the inside of the jacket 120, as shown in the drawings.

According to an optical fiber splicing member 200 with the above end plugs 230, in a state with the cap 140 being set to the setting position 147, the second tongue-shaped members 232 do not come into contact with the buffer coatings 192 yet as is clear from FIG. 13. When the cap 140 is pressed down from the setting position 147 to the setting completion position 148, first the joint element 110 holds the bare fibers 191, and then the first projecting members 144 come into contact with and presses down the second tongue-shaped members 232. Therefore, in a state where the cap 140 is positioned to the setting completion position 148, the second tongue-shaped members 232 are pressed down by the first projecting members 144, thereby pressing the buffer coatings 192 to the optical fiber passages 122 as indicated in FIG. 14. The second tongue-shaped members 232 return to the original state by their elastic force when the cap 140 is returned to the setting position 147.

The same effect as exerted by the structure having the first tongue-shaped member 132 can be exhibited also by the structure with the above second tongue-shaped member 232. Moreover, when the second tongue-shaped member 232 is formed to extend from the end plug edge 234 to the inside of the jacket 120, an advancement direction of the optical fiber 190 to be inserted into the jacket 120 from the insertion opening 233 is made equal to the extension direction of the second tongue-shaped member 232, thus enabling the optical fiber 190 to be inserted smoothly.

According to the optical fiber splicing member of the first aspect of the present invention as is fully described above, the jacket has the buffer retainers and also the pressing parts, whereby the buffer coatings can be pressed by pressing the buffer retainers by the pressing parts. In comparison with the conventional art, the structure is made simple and the optical fiber buffer parts can be held stably. Besides, the existing optical fiber splicing tool can be utilized as it is.

According to the optical fiber splicing member of the second aspect of the present invention, it is enough to set only one cap to the jacket. By pressing down the cap, the bare fibers can be held by the joint element while butt-jointed against each other, and the buffer coatings can be pressed by the buffer retainers. Since it is enough to set only one cap to the jacket as above, assembling the optical fiber splicing member in the production process is facilitated.

Additionally, since holding the bare fibers and pressing the buffer coatings are both executed by the operation of pressing down the one cap as above, the existing optical fiber splicing tool is utilizable as it is.

The buffer coatings are held through pressing by the buffer retainers associated with the operation of pressing down the cap. Therefore, the holding force for the buffer coating is prevented from changing large in response to a change of the diameter of the buffer coating due to production errors. The buffer coatings of the optical fibers can be held stably.

By the constitution in which the buffer retainer has the first tongue-shaped member and the engagement part, and the buffer coating is pressed by the first tongue-shaped member, pressing through face contact is enabled to the buffer coating, thus preventing the pressing force from acting locally to the optical fiber.

A high manufacturing accuracy is not required for the first projecting member and the second projecting member by constituting to move the first tongue-shaped member towards the buffer coating through the first projecting member of the cap coming into contact with the second projecting member. The pressing force to the buffer coating is advantageously resistant to effects of a manufacturing tolerance of the first projecting member and the second projecting member.

When the buffer retainer is made the second tongue-shaped member, the structure can be simplified as compared with the case in which there are provided the first tongue-shaped member and the engagement part.

In addition, when the buffer retainer is to be formed to the end plug, manufacturing the buffer retainer is facilitated.

This application claims priority to Japanese Patent Application No. 240836/2002, which is incorporated by reference in its entirety.

The breadth and scope of the invention should not be limited by any of the above-described exemplary embodiments.

We claim:

1. A splicing member for splicing optical fibers each having a bare fiber coated with a buffer coating, comprising:
   a joint element for retaining the bare fibers in a state in which the bare fibers are butt-jointed against each other, wherein the joint elements comprises two opposing folding members joined at a coupling part and openable between a non hold position where the element does not hold the bare fibers and a hold position where the element holds the bare fibers;
   a jacket including an element storage part for storing the joint element, optical fiber passages for guiding the optical fibers to end parts of the joint element stored in the element storage part respectively, and buffer retainers for opposing the buffer coatings of the optical fibers when the optical fibers are extended along the optical fiber passages in an extension direction; and
   pressing parts for pressing the buffer retainers to the buffer coatings of the optical fibers when the optical fibers are extended along the optical fiber passages.

2. The splicing member according to claim 1, further comprising:
   a cap mounted to the jacket and moveable in an orthogonal direction to the extension direction of the optical fibers when the optical fibers are extended in the optical fiber passages, and including a cap body, a holding part formed to the cap body to be engaged with the joint element stored in the element storage part through movement of the cap in the orthogonal direction for causing the joint element to retain the bare fibers, and pressing parts formed to the cap body for pressing the buffer retainers to the buffer coatings through the movement of the cap in the orthogonal direction.

3. The optical fiber splicing member according to claim 2, in which each of the buffer retainers has a first tongue-shaped member extending in the extension direction, and an engagement part formed to the first tongue-shaped member in a manner engageable with the pressing part for moving the first tongue-shaped member towards the buffer coating through the movement of the cap in the orthogonal direction.

4. The optical fiber splicing member according to claim 3, wherein each of the pressing parts of the cap includes a first projecting member which is to project from the cap body in the orthogonal direction, and wherein the engagement part includes a second projecting member which comes in contact with the first projecting member to move the first tongue-shaped member towards the buffer coating by movement of the first projecting member in the orthogonal direction.

5. The optical fiber splicing member according to claim 3, wherein each of the pressing parts of the cap includes a first projecting member which is to project from the cap body in the orthogonal direction, while each of the buffer retainers includes a second tongue-shaped member extending in the extension direction which comes in touch with the first projecting member to move towards the buffer coating by movement of the first projecting member in the orthogonal direction.

6. A splicing member for splicing optical fibers, comprising:
   a joint element for retaining bare fibers of two optical fibers each having the bare fiber coated with a buffer coating in a state in which the bare fibers are butt-jointed against each other;
   a jacket including an element storage part for storing the joint element, and optical fiber passages for guiding the optical fibers to end parts of the joint element stored in the element storage part respectively;
   buffer retainers constituted integrally with the jacket for opposing the buffer coatings of the optical fibers when the optical fibers are extended along the optical fiber passages; and
   a cap mounted to the jacket and moveable in an orthogonal direction to an extension direction of the optical fibers when the optical fibers are extended in the optical fiber passages, and including a cap body, a holding part formed to the cap body to be engaged with the joint element stored in the element storage part through movement of the cap in the orthogonal direction for causing the joint element to retain the bare fibers, and pressing parts formed to the cap body for pressing the buffer retainers to the buffer coatings through the movement of the cap in the orthogonal direction, wherein each of the buffer retainers has a first tongue-shaped member extending in the extension direction, and an engagement part formed to the first tongue-shaped member in a manner engageable with the pressing part for moving the first tongue-shaped member towards the buffer coating through the movement of the cap in the orthogonal direction, wherein each of the pressing parts of the cap includes a first projecting member which is to project from the cap body in the orthogonal direction, and wherein the engagement part includes a second projecting member which comes in contact with the first projecting member to move the first tongue-shaped member towards the buffer coating by movement of the first projecting member in the orthogonal direction.

7. The optical fiber splicing member according to claim 6, wherein the jacket includes end plug storage parts formed to both ends thereof, and further comprising:
   end plugs that include the buffer retainers and that extend in the same direction as the direction of the optical fiber passages while constituted integrally with the jacket by being fitted in the end plug storage parts.

* * * * *

UNITED STATES PATENT AND TRADEMARK OFFICE
CERTIFICATE OF CORRECTION

| | | |
|---|---|---|
| PATENT NO. | : 7,140,787 B2 | Page 1 of 1 |
| APPLICATION NO. | : 10/522003 | |
| DATED | : November 28, 2006 | |
| INVENTOR(S) | : Takaya Yamauchi | |

It is certified that error appears in the above-identified patent and that said Letters Patent is hereby corrected as shown below:

Column 5,
Line 24, delete "11b" and insert in place thereof -- 111b --.

Column 13,
Line 12, delete "elements" and insert in place thereof -- element --.

Signed and Sealed this

Twenty-fourth Day of April, 2007

JON W. DUDAS
*Director of the United States Patent and Trademark Office*